3,095,443

(α-HYDROXY-α-ARYLAMINOACETYL)ARYL DERIVATIVES

Guido Cavallini and Elena Massarani, Milan, Italy, assignors to Francesco Vismara S.p.A., Casatenovo (Como), Italy
No Drawing. Filed Apr. 25, 1961, Ser. No. 105,293
Claims priority, application Italy May 3, 1960
6 Claims. (Cl. 260—471)

This invention relates to novel chemical compounds and particularly (α-hydroxy-α-arylaminoacetyl)-aryl derivatives having antiviral activity. More specifically, the novel compounds of this invention possess a very pronounced chemotherapeutic activity, especially in various types of viral infections, for example influenza, hepatitis, dermatomyositis, Herpes simplex and zoster, Coxsackie virus, adenovirus, Echo virus and Carré virus. These compounds have a very low order of toxicity.

The compounds of this invention are represented by the following general formula:

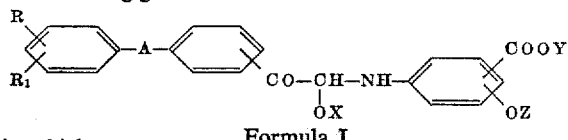

Formula I in which:

R represents hydrogen, halogen of atomic weight less than 80, preferably chlorine or bromine, hydroxy, alkoxy of from 1 to 4 carbon atoms, preferably methoxy, alkyl of from 1 to 4 carbon atoms, preferably methyl, or benzyloxy;

$R_1$ represents hydrogen or halogen of atomic weight less than 80, preferably chlorine or bromine;

A represents a single direct valence bond, oxygen, sulfur, sulfinyl (SO), sulfonyl ($SO_2$), methylene ($CH_2$), ethylene ($CH_2$—$CH_2$) or vinylene (CH=CH);

X represents hydrogen or a hydrocarbon radical of from 1 to 12 carbon atoms, inclusive;

Y represents hydrogen, an alkali metal cation, preferably sodium or potassium, or lower alkyl of from 1 to 4 carbon atoms; and Z represents hydrogen, methyl or acetyl.

Advantageous compounds of this invention are represented by the following general formula:

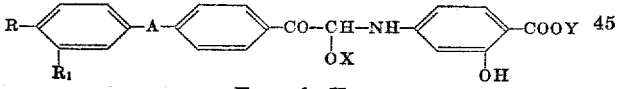

Formula II in which:

R represents hydrogen, hydroxy or methoxy;
$R_1$ represents hydrogen or chlorine;
A represents a single direct valence bond, oxygen, sulfur, sulfonyl, ethylene or vinylene;
X represents hydrogen or lower alkyl of from 1 to 4 carbon atoms, preferably methyl or ethyl; and
Y represents hydrogen, methyl or ethyl.

The novel (α-hydroxy-α-arylaminoacetyl)-aryl derivatives of Formula I are prepared by condensing an addition compound of an aryl glyoxal, particularly an alcoholate or hydrate, with an amino benzoic acid or its ester or alkali metal salt. The condensation reaction is illustrated by the following equation:

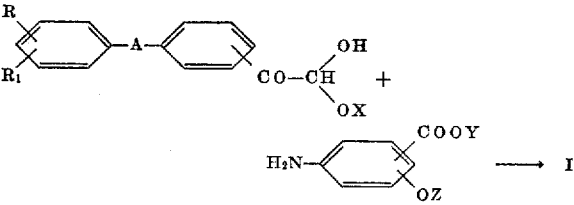

in which R, $R_1$, A, X, Y and Z are as defined above for Formula I.

By using the glyoxal hydrate in the above reaction the compounds wherein X is hydrogen are obtained; by using the glyoxal alcoholate the compounds wherein X is the corresponding hydrocarbon radical are obtained.

The condensation is carried out by reacting approximately equimolar amounts of the glyoxal compound and the amino acid in the presence of an inert solvent in which the reagents are relatively soluble at a temperature in the range of from ambient or room temperature, about 20° C., to about the boiling point of the solvent employed for from 15 minutes to 24 hours, depending on the reaction temperature and the chemical nature of the reagents. Preferably the reaction time is from about one-half to eight hours at a temperature from about 40–100° C.

Solvents advantageously used in the condensation reaction are the alcohols corresponding to the glyoxal alcoholate starting material. For example, if the methylate starting material is used it is desirable to use methyl alcohol as the reaction solvent. It is preferable to exclude water from the reaction mixture when forming compounds where X is a hydrocarbon radical.

When a glyoxal hydrate is used as the starting material, it is desirable to employ a non-alcoholic type solvent, advantageously aryl solvents, ethers or cycloaliphatic solvents. It is preferable to exclude alcohols from this reaction mixture.

The condensation product is generally isolated from the reaction mixture by distilling off the major portion of the solvent, filtering the precipitate obtained after cooling the residue and recrystallizing.

The glyoxal alcoholate and hydrate starting materials are readily prepared by treating the glyoxal with water or alcohol at a temperature in the range of from ambient or room temperature to the boiling point of the solution. The glyoxals themselves are either known or can be prepared by oxidation of the corresponding aryl methyl ketone with selenium dioxide or by treatment of corresponding aryl dihalogenacetyl derivatives with an alkali metal alcoholate, followed by acidic hydrolysis of the intermediate acetal. More complete methods for the preparation of these starting materials are described in copending applications Serial No. 829,532 filed July 27, 1959, now Patent No. 3,036,131 and Serial No. 45,281 filed July 26, 1960.

The following examples illustrate the compounds embraced by Formula I and as exemplary are not intended to limit the scope of the invention broadly defined herein.

Example 1

A solution of 2.1 g. of 4-biphenylylglyoxal in 40 cc. of anhydrous ethyl alcohol is heated to 60° C. and 1.67 g. of methyl p-aminosalicylate is added. The mixture is heated at 60° C. with stirring for four hours. After cooling there is obtained 4-[α-ethoxy-α-(3-hydroxy-4-carbomethoxyphenylamino)-acetyl]-biphenyl as a white crystalline product, M.P. 118–119° C.

The same compound is obtained by treating the ethyl alcoholate of 4-biphenylylglyoxal with methyl p-aminosalicylate in dioxane.

Example 2

A solution of 2.4 g. of 4'-methoxybiphenyl-4-glyoxal hydrate in 60 cc. of tetrahydrofuran is heated at 50° C. and then 1.52 g. of p-aminosalicylic acid is added. The solution is refluxed for three hours, cooled and filtered to give 4-[α-hydroxy-α-(3-hydroxy-4-carboxyphenylamino)-acetyl]-4'-methoxybiphenyl.

Carrying out the reaction under the same conditions with acetyl p-aminosalicylic acid yields 4-[α-hydroxy-α-(3-acetoxy-4-carboxyphenylamino)-acetyl]-4'-methoxybiphenyl.

Example 3

A solution of 2.7 g. of the propargylate of 4-biphenylylglyoxal (M.P. 97° C.) in 60 cc. of dioxane is treated with 1.65 g. of ethyl p-aminosalicylate. The mixture is heated at 60° C. for four hours and then cooled slowly to precipitate 4-[α-proargyloxy-α-(3-hydroxy-4-carbethoxyyphenylamino)-acetyl]-biphenyl.

Similarly, using the allylate of 4-biphenylylglyoxal (M.P. 93° C.) and following the above conditions there is obtained the 4-[α-allyloxy-α-(3-hydroxy-4-carbethoxyphenylamino)-acetyl]-biphenyl.

Example 4

To a solution of 2.1 g. of 4-biphenylylglyoxal hydrate in 50 cc. of ethyl alcohol heated at 60° C. is added 2 g. of isopropyl p-aminosalicylate. The mixture is stirred at 60° C. for about four hours and then cooled slowly to precipitate 4-[α-ethoxy-α-(3-hydroxy-4-carboisopropoxyphenylamino)-acetyl]-biphenyl, M.P. 107–108° C.

Carrying out the same reaction in tetrahydrofuran instead of ethyl alcohol furnishes the 4-[α-hydroxy-α-(3-hydroxy-4-carboisopropoxyphenylamino)acetyl]-biphenyl.

Example 5

2.7 g. of 3'-chloro-4'-methoxybiphenyl-4-glyoxal hydrate is placed in anhydrous benzyl alcohol previously heated at 75° C. To the solution thus obtained is added 1.45 g. of p-aminosalicylic acid and the mixture maintained at 75° C. for two hours. Cooling yields the precipitate 4-[α-benzyloxy-α-(3-hydroxy-4-carboxyphenylamino)-acetyl]-3'-chloro-4'-methoxybiphenyl.

Example 6

A mixture of 7.5 g. of anhydrous 4-biphenylylglyoxal in 60 cc. of anhydrous methanol is heated at 60° C. with stirring until the solution is clear. Cooling separates the methylate, M.P. 95–96° C.

A solution of 4.8 g. of this methylate and 2.8 g. of p-aminosalicylic acid in 60 cc. of methanol is heated at 60° C. for four hours. Cooling separates the 4-[α-methoxy-α-(3-hydroxy - 4 - craboxyphenylamino) - acetyl]-biphenyl.

A portion of this biphenyl derivative (500 mg.) is dissolved in water containing a molar equivalent of sodium hydroxide. Evaporation yields the sodium salt.

Another 200 mg. portion of this biphenyl derivative is dissolved in anhydrous dioxane and reacted with potassium metal to yield the potassium salt.

Example 7

5.4 g. of 3'-bromobiphenyl-4-glyoxal methylate is refluxed for six hours with 3 g. of methyl p-aminoacetylsalicylate in 50 cc. of methanol. Cooling separates the 4 - [α - methoxy - α - (3 - acetoxy - 4 - carbomethoxyphenylamino)-acetyl]-3'-bromobiphenyl.

Example 8

A solution of 5.4 g. of 4'-benzyloxybiphenyl-4-glyoxal in 75 cc. of ethanol is refluxed at 60° C. for five hours. An equimolar amount of sodium p-aminosalicylate is added and heating is continued for one hour. Cooling and concentration yields the sodium salt of 4-[α-ethoxy-α-(3 - hydroxy - 4 - carboxyphenylamino) - acetyl] - 4'-benzyloxybiphenyl.

Example 9

A solution of 5.4 g. of 3',4'-dichlorobiphenyl-4-glyoxal in 100 cc. of methanol is heated at 60° C. for four hours to give after evaporation and cooling the methylate. This compound 2.9 g. is refluxed in methanol with 1.6 g. of p-aminosalicylic acid for two hours. Cooling separates the 4 - [α - methoxy - α - (3 - hydroxy - 4 - carboxyphenylamino)-acetyl]-3',4'-dichlorobiphenyl.

Example 10

A mixture of 1.14 g. of 4-biphenylylglyoxal hydrate and 0.8 g. of p-aminosalicylic acid in 20 cc. of dioxane is refluxed for two hours, then cooled and filtered to give 4 - [α - hydroxy - α - (3 - hydroxy - 4 - carboxyphenylamino)-acetyl]-biphenyl.

Example 11

A mixture of 2.8 g. of 3'-chloro-4'-methoxybiphenyl-4-glyoxal hydrate and 10 g. of citionellol in 100 cc. of anhydrous benzene is heated at reflux for 12 hours over a water trap (Org. Sgn. 3, 382) having an inner funnel charged with a mixture of phosphorus pentoxide and a filter aid. The mother liquor is concentrated in vacuo to give the citronellylate. This compound (4.2 g.) in benzene solution is heated at 60° C. for eight hours with 1.8 g. of methyl p-aminoacetylsalicylate. Cooling and filtering yields 4-[α-citronellyloxy-α-(3-acetoxy-4-carbomethoxyphenylamino) - acetyl] - 3' - chloro - 4' - methoxybiphenyl.

Similarly, 3.5 g. of 4-biphenylylglyoxal hydrate in 100 cc. of anhydrous benzene is treated with 30 cc. of octyl alcohol as described above to give 4-biphenylylglyoxal octylate, M.P. 54–58° C. which is reacted with p-aminosalicylic acid to give 4-[α-octyloxy-α-(3-hydroxy-4-carboxyphenylamino)-acetyl]-biphenyl.

Example 12

9.0 g. of 3'-hydroxybiphenyl-4-glyoxal is suspended in 50 cc. of anhydrous isopropyl alcohol and the mixture stirred and heated at 60° C. for four hours when the solution is clear. After evaporation the isopropylate is obtained. This compound is treated with an equimolar amount of potassium p-aminosalicylate in benzene to yield 4 - [α - isopropoxy - α - (3 - hydroxy - 4 - carboxyphenylamino)-acetyl]-3'-hydroxybiphenyl potassium salt.

Example 13

5.5 g. of 3'-chloro-4'-methylbiphenyl-4-glyoxal is heated for several hours in 75 cc. of methanol and then the methanolic solution of the methylate thus obtained is treated with 3 g. of p-aminoacetylsalicylic acid to give 4-[α-methoxy - α - (3 - acetoxy-4-carboxyphenylamino)-acetyl]-3'-chloro-4'-methylbiphenyl.

Example 14

2.44 g. of diphenylether-4-glyoxal hydrate is dissolved in 50 cc. of anhydrous ethyl alcohol by heating at 60° C. for 30 minutes. To the solution thus obtained is added 1.85 g. of ethyl p-aminosalicylate dissolved in 25 cc. of ethanol. Heating is continued for two hours and then the solution is cooled slowly to yield 4-[α-ethoxy-α-(3-hydroxy - 4-carbethoxyphenylamino)-acetyl]-diphenylether.

Example 15

A solution of 2.74 g. of 4'-methoxydiphenylether-4-glyoxal hydrate in 50 cc. of dioxane is heated at 60° C. for about 30 minutes and then a solution of 1.61 g. of p-aminosalicylic acid in 25 cc. of dioxane is added. Heating is continued for another three hours; cooling yields 4-[α-hydroxy - α - (3 - hydroxy-4-carboxyphenylamino)-acetyl]-4'-methoxydiphenylether.

Employing ethanol instead of dioxane as described above furnishes the 4-[α-ethoxy-α-(3-hydroxy-4-carboxyphenylamino)-acetyl]-4'-methoxydiphenylether.

Example 16

2.54 g. of stilbene-4-glyoxal hydrate is treated with 50 cc. of anhydrous ethanol at 60° C. for one hour. A solution of 1.61 g. of p-aminosalicylic acid in 25 cc. of ethanol is added to the ethylate thus formed and the mixture heated for three hours. Cooling gives a precipitate of 4 - [α - ethoxy - α - (3 - hydroxy-4-carboxyphenylamino)-acetyl]-stilbene.

Example 17

2.56 g. of diphenylethane-4-glyoxal hydrate is heated at 60° C. for 30 minutes with 50 cc. of anhydrous ethanol. A solution of 1.61 g. of p-aminosalicylic acid in 25 cc. of ethanol is added and heating continued for three hours. Cooling precipitates 4-[α-ethoxy-α-(3-hydroxy-4-carboxyphenylamino)-acetyl]-diphenylethane.

Example 18

2.6 g. of diphenylsulfide-4-glyoxal hydrate is heated at 60° C. for 30 minutes with 50 cc. of ethanol and then treated with 1.61 g. of p-aminosalicylic acid as described above to yield 4-[α-ethoxy-α-(3-hydroxy-4-carboxyphenylamino)-acetyl]-diphenylsulfide.

Example 19

A solution of 2.9 g. of diphenylsulfone-4-glyoxal hydrate in 60 cc. of dioxane is heated at 60° C. for 30 minutes and then a solution of 1.61 g. of p-aminosalicylic acid is added. Heating for three hours followed by cooling gives the product, 4-[α-hydroxy-α-(3-hydroxy-4-carboxyphenylamino)-acetyl]-diphenylsulfone.

Operating in ethanol instead of dioxane and under the same reaction conditions as above gives 4-[α-ethoxy-α-(3-hydroxy - 4 - carboxyphenylamino) - acetyl]-diphenylsulfone.

Example 20

2.42 g. of diphenylmethane-4-glyoxal hydrate is heated at 60° C. for one hour with 50 cc. of ethanol and then 1.61 g. of p-aminosalicylic acid in 50 cc. of ethanol is added. Heating is continued for three hours and the reaction mixture is cooled to yield 4-[α-ethoxy-α-(3-hydroxy - 4-carboxyphenylamino)-acetyl]-diphenylmethane.

Example 21

4.9 g. of diphenylether-2-glyoxal hydrate is dissolved in 50 cc. of dioxane and the solution obtained is treated with 3.3 g. of p-aminosalicylic acid as described above to give 2 - [α - hydroxy - α - (3-hydroxy-4-carboxyphenylamino)-acetyl]-diphenylether.

Similarly 4.9 g. of diphenyether-3-glyoxal hydrate is reacted with 3.3 g. of p-aminosalicylic acid to give 3-[α-hydroxy - α - (3-hydroxy-4-carboxyphenylamino)-acetyl]-diphenylether.

Example 22

2.76 g. of diphenylsulfoxide-4-glyoxal hydrate is heated at 60° C. for two hours with ethanol. The solution obtained is treated with 1.8 g. of 4-amino-2-methoxy-benzoic acid in 25 cc. of ethanol as described above to give 4-[α-ethoxy - α - (3 - methoxy-4-carboxyphenylamino)-acetyl]-diphenylsulfoxide.

Example 23

4'-tert.-butylbiphenyl-4-glyoxal (5 g.) is heated with 26 cc. of cyclohexanol in benzene as in Example 11 to give the cyclohexylate. This compound is then reacted with an equivalent amount of p-aminosalicylic acid in benzene to give 4-[α-cyclohexyloxy-α-(3-hydroxy-4-carboxyphenylamino)-acetyl]-4'-tert.-butylbiphenyl.

What is claimed is:

1. A chemical compound of the formula:

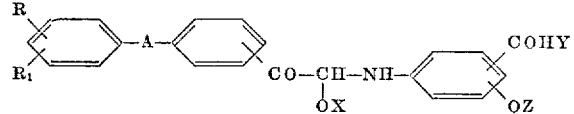

in which R is a member selected from the group consisting of hydrogen, halogen of atomic weight less than 80, hydroxy, alkoxy of from 1 to 4 carbon atoms, alkyl of from 1 to 4 carbon atoms and benzyloxy; $R_1$ is a member selected from the group consisting of hydrogen and halogen of atomic weight less than 80; A is a member selected from the group consisting of a single direct valence bond, oxygen, sulfur, sulfinyl, sulfonyl, methylene, ethylene and vinylene; X is a member selected from the group consisting of hydrogen, aliphatic hydrocarbon of from 1 to 12 carbon atoms, cyclohexyl and benzyl; Y is a member selected from the group consisting of hydrogen, an alkali metal cation and alkyl of from 1 to 4 carbon atoms; and Z is a member selected from the group consisting of hydrogen, methyl and acetyl.

2. A chemical compound of the formula:

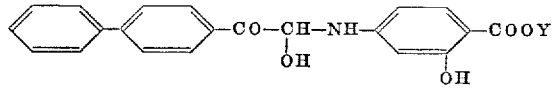

in which X is lower alkyl of from 1 to 8 carbon atoms and Y is lower alkyl of from 1 to 4 carbon atoms.

3. The chemical compound of the formula:

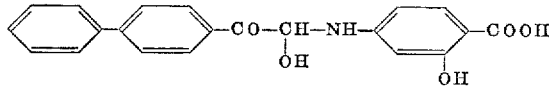

4. 4 - [α - ethoxy-α-(3-hydroxy-4-carbomethoxyphenylamino)-acetyl]-biphenyl.

5. 4 - [α - ethoxy - α - (3-hydroxy-4-carbethoxyphenylamino)-acetyl]-diphenylether.

6. 4 - [α - ethoxy - α-(3-hydroxy-4-carboxyphenylamino)-acetyl]-diphenylsulfide.

References Cited in the file of this patent

Cavallini et al.: J. Med. Pharm. Chem., 2, No. I, 99–106 (1960).

UNITED STATES PATENT OFFICE
CERTIFICATE OF CORRECTION

Patent No. 3,095,443                      June 25, 1963

Guido Cavallini et al.

It is hereby certified that error appears in the above numbered patent requiring correction and that the said Letters Patent should read as corrected below.

Column 6, lines 11 to 17, the extreme upper right-hand portion of the structural formula, for "COHY" read -- COOY --.

Signed and sealed this 31st day of December 1963.

(SEAL)
Attest:
ERNEST W. SWIDER

EDWIN L. REYNOLDS

Attesting Officer                      Acting Commissioner of Patents